(151.)
JOHN J. CLAUSE.
Improvement in Piston Packing.
No. 122,570. Patented Jan. 9, 1872.
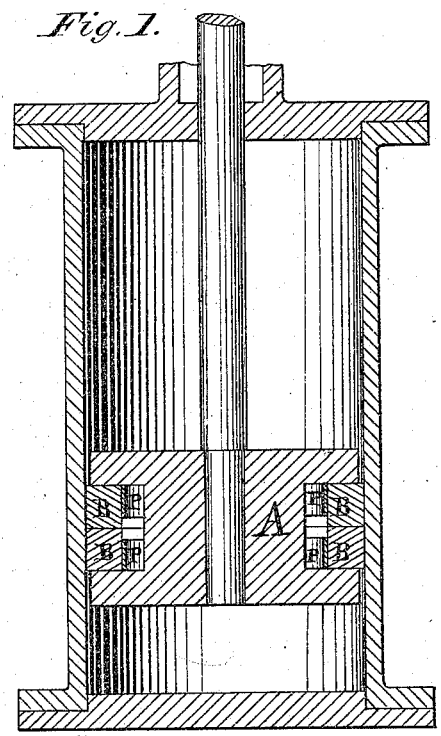
Fig. 1.
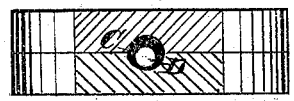
Fig. 4.
Fig. 2.
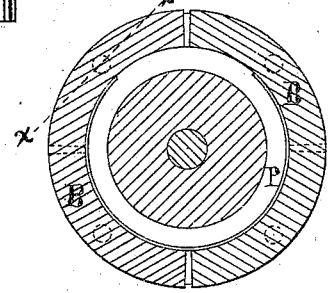
Fig. 3.
Witnesses:
S. Morris Pool
Rob't H. Whittlesey
Inventor:
John J. Clause
by his att'y
Chas B. Stilwell

UNITED STATES PATENT OFFICE.

JOHN J. CLAUSE, OF CLEVELAND, OHIO, ASSIGNOR OF TWO-THIRDS OF HIS RIGHT TO EZRA NICHOLSON AND CHARLES B. STILWELL, OF SAME PLACE.

IMPROVEMENT IN PISTON-PACKINGS.

Specification forming part of Letters Patent No. 122,570, dated January 9, 1872.

SPECIFICATION.

Specifications describing certain Improvements in Piston-Packing, invented by JOHN J. CLAUSE, of Cleveland, in the county of Cuyahoga and State of Ohio.

My invention relates to a simple and effective piston-packing for engines, pumps, &c.

Figure 1 is a vertical section of the cylinder and packing. Fig. 2 is a horizontal section of the packing. Fig. 3 is the spring. Fig. 4 is a vertical section of the packing through the line $x\ x$ in Fig. 2.

A is the piston-head, made of any suitable metal, having a groove turned in its face to receive the packing. This head may be made of two or more pieces, so arranged as to form the desired groove. B B B B are segments of two metallic rings, the outside diameter of which coincides with the inside diameter of the cylinder. These segments are placed in the groove in such manner as to re-form the two rings, one lying on the other, and when so arranged should fill the width of the groove, but should leave a space between the inside of the rings and the bottom of the groove, as shown in Fig. 2. A flat spring cut out of a solid piece, shaped similar to P, Fig. 3, and properly bent and placed inside the rings, as shown in Fig. 2, where it not only forces out the segments to compensate for the wear, but also makes the packing nearly steam or air tight by closing up the openings caused by the joints. In placing the segments in the groove they should be so arranged that the joints in the one ring will not be directly over the joints in the other; and that they may remain in this position, cavities C are made between the upper and lower segments, into which small balls D are placed, as shown in Fig. 4. The balls do not fill the cavities C, but are large enough to project beyond the dividing-line of the segments. While, therefore, they do not interfere with the free moving of the segmental rings, they accomplish the desired result.

This packing is more particularly adapted to small engines; and its advantages are great simplicity, economy, and durability.

Having thus described my invention, I claim—

The spring P and segmental rings B, in combination with cavities C and balls D, constructed and arranged substantially as described.

JNO. J. CLAUSE.

Witnesses:
CHARLES A. STIBLE,
AUG. G. KIEL.

(151)